US012763233B2

(12) United States Patent
Gurley et al.

(10) Patent No.: US 12,763,233 B2
(45) Date of Patent: Oct. 13, 2026

(54) FLEXIBLE CONDUIT WITH END-TO-END POSITION DETERMINATION

(71) Applicant: International Business Machines Corporation, Armonk, NY (US)

(72) Inventors: Nathan Montgomery Gurley, Maineville, OH (US); Prach Jerry Chuaypradit, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 18/746,273

(22) Filed: Jun. 18, 2024

(65) Prior Publication Data

US 2025/0385025 A1 Dec. 18, 2025

(51) Int. Cl.

*H01B 7/18* (2006.01)
*H01B 7/04* (2006.01)
*H01B 9/00* (2006.01)

(52) U.S. Cl.

CPC ............... *H01B 9/003* (2013.01); *H01B 7/04* (2013.01); *H01B 7/18* (2013.01)

(58) Field of Classification Search

CPC .. H01B 7/04; H01B 9/003; H01B 7/18; G06F 2113/16
USPC ........................................................ 174/68.1
See application file for complete search history.

(56) References Cited

U.S. PATENT DOCUMENTS

| | | | | |
|---|---|---|---|---|
| 6,707,445 B1 | 3/2004 | Hasemann | | |
| 7,070,571 B2 * | 7/2006 | Kramer | A61B 5/6831 | 600/595 |
| 9,335,799 B2 | 5/2016 | Nguyen et al. | | |
| 9,940,814 B1 * | 4/2018 | Ahukanna | G01V 7/06 | |
| 10,502,558 B2 * | 12/2019 | Sasaki | G01B 11/18 | |
| 2004/0263424 A1 | 12/2004 | Okuley | | |
| 2008/0124969 A1 | 5/2008 | Walker | | |
| 2010/0215311 A1 * | 8/2010 | Moore | G01B 11/18 | 356/73.1 |
| 2010/0321275 A1 | 12/2010 | Hinckley et al. | | |
| 2011/0256756 A1 | 10/2011 | Lu et al. | | |
| 2014/0136749 A1 | 5/2014 | North et al. | | |
| 2016/0076359 A1 * | 3/2016 | Danisch | E02D 29/10 | 33/304 |
| 2017/0191883 A1 * | 7/2017 | Wei | H01Q 13/203 | |
| 2019/0301846 A1 * | 10/2019 | Elsasser | H01B 7/326 | |

FOREIGN PATENT DOCUMENTS

| | | |
|---|---|---|
| TW | 201443657 A | 11/2014 |

* cited by examiner

*Primary Examiner* — Timothy J Thompson
*Assistant Examiner* — Michael F McAllister
(74) *Attorney, Agent, or Firm* — Tihon Poltavets, Esq; Kevin P. Radigan, Esq.; Heslin Rothenberg Farley & Mesiti P.C.

(57) ABSTRACT

Method and apparatus for conduit position determination are provided. A flexible conduit comprising a first end and a second end, a set of bend sensors affixed to the flexible conduit and configured to output bend data indicating bends in the flexible conduit, and a processing component configured to determine a relative position of the first end of the flexible conduit relative to the second end of the flexible conduit based on the bend data is provided.

20 Claims, 7 Drawing Sheets

FLEXIBLE CONDUIT WITH END-TO-END POSITION DETERMINATION

BACKGROUND

The present disclosure relates to flexible conduit, and more specifically, to techniques and hardware for determining the relative positioning of the ends of flexible conduit.

A wide variety of computing systems have continued to shrink to smaller and smaller sizes while continuing to provide equivalent or even improved compute capabilities. For example, laptop computers can serve as a powerful, portable computing machine. Laptops have become increasingly important or useful to millions of individuals globally. Although such portable devices are a great and highly-useful utility, they do come with some limitations. For example, the size of the screen or display of such devices varies depending on the model, but even larger devices often have relatively small displays. That is, modern computing devices often include small displays to enhance portability, but such displays may be too small for the tasks the user wishes to perform. Therefore, the use of external displays (e.g., a monitor, a television, and the like) is increasingly common to expand the usefulness of the portable device. Advantageously, the portability of such computing devices allows users to move from monitor to monitor as desired (or move relative to a single monitor), but each time the computing device and/or the external display is moved, the desired display configurations may change. Currently, reconfiguring the display is an entirely manual process which is tedious and often frustrating.

SUMMARY

According to one embodiment of the present disclosure, an apparatus is provided. The apparatus includes a transmission cable comprising a first end and a second end; a set of bend sensors affixed to the transmission cable and configured to output bend data indicating bends in the transmission cable; and a processing component configured to determine a relative position of the first end of the transmission cable relative to the second end of the transmission cable based on the bend data.

According to one embodiment of the present disclosure, a cable is provided. The cable includes a conductor comprising a first end and a second end; a set of bend sensors affixed to the conductor and configured to output bend data indicating bends in the conductor; and a transmission component configured to output the bend data to at least one of (i) a computing device coupled to the first end of the conductor or (ii) a computing device coupled to the second end of the conductor.

According to one embodiment of the present disclosure, a flexible conduit, is provided. The flexible conduit includes a first end and a second end; a set of bend sensors affixed to the flexible conduit and configured to output bend data indicating bends in the flexible conduit; and a processing component configured to determine a relative position of the first end of the flexible conduit relative to the second end of the flexible conduit based on the bend data.

According to one embodiment of the present disclosure, a method is provided. The method includes accessing bend data for a set of sections of a conduit; determining a relative offset of each respective section of the conduit based on the bend data; and aggregating the relative offsets to determine a relative position of a first end of the conduit with respect to a second end of the conduit.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; and a computer program product embodied on a computer-readable storage medium comprising code for performing the aforementioned methods as well as those further described herein.

The following description and the related drawings set forth in detail certain illustrative features of one or more embodiments.

DETAILED DESCRIPTION

Figure 1:
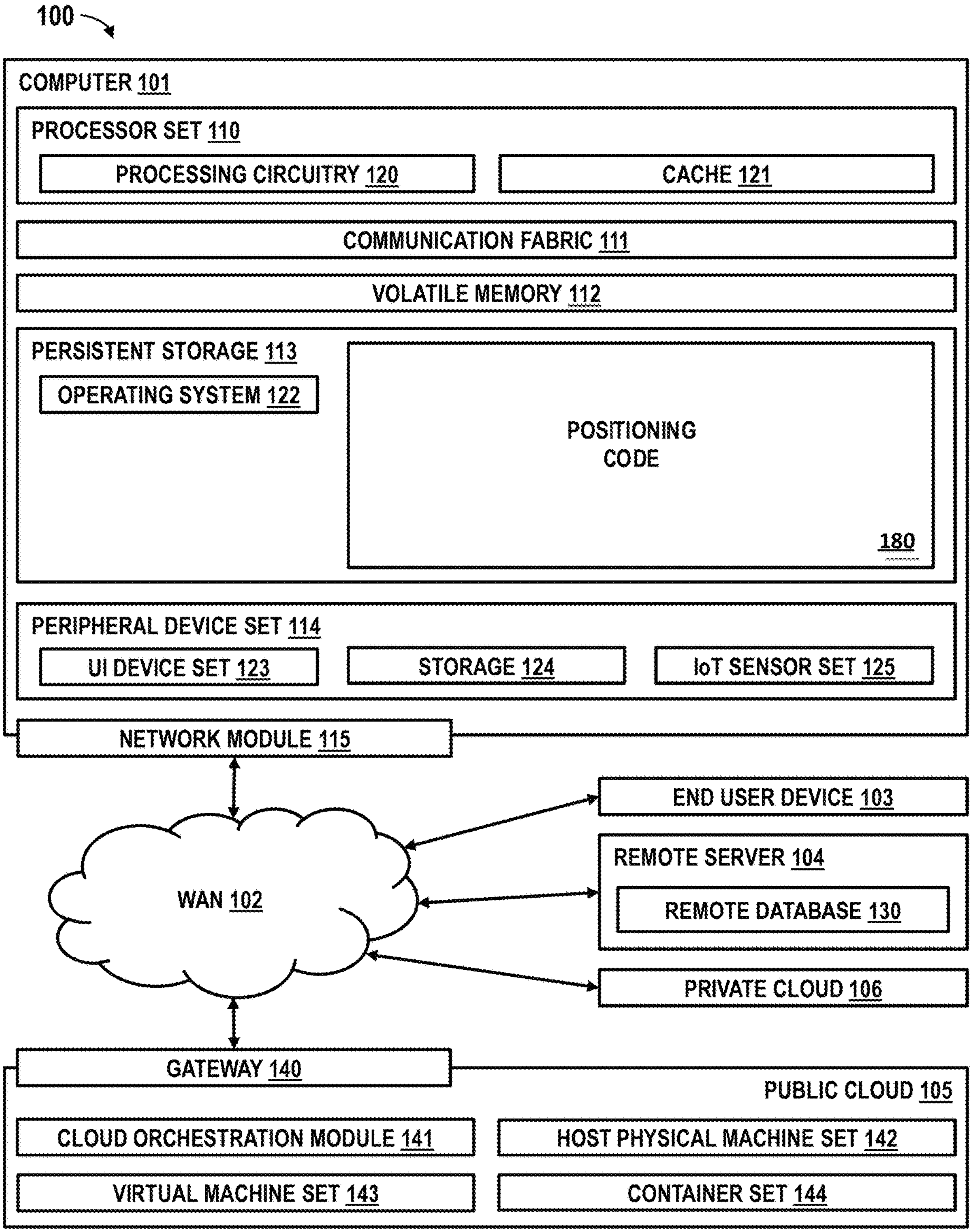
FIG. 1 depicts an example computing environment for the execution of at least some of the computer code involved in performing the disclosed methods.

In some embodiments, architectures and techniques for determining the relative positioning of flexible conduits are provided.

As used herein, a conduit may generally refer to any channel or corridor configured to (or able to) transmit, convey, and/or enclose or otherwise protect things within the conduit. For example, a conduit may correspond to a transmission cable having one or more conductors for transmitting electrical energy (e.g., a high-definition multimedia interface (HDMI) cable, an Ethernet cable, a power cable such as a non-metallic (NM) wiring cable, and the like). As another example, a conduit may correspond to a tube (e.g., constructed from polyvinyl chloride (PVC) or other material) that may contain things such as electrical wiring, water or other liquids, gasses, and the like.

In some embodiments, the conduits are at least partially flexible (e.g., such that one end of the conduit may be displaced or moved relative to the other end). For example, the conduit may include a flexible cable where either end may be freely moved. That is, the conduit may be referred to as "flexible" to indicate that the positions of each end may change, relative to each other (e.g., the first end may be in any location relative to the second end, constrained by factors such as the amount of flexibility the material exhibits, the length of the material, the stretchiness of the material, and the like).

In embodiments of the present disclosure, conduits comprising a set of bend sensors (also referred to in some aspects as flex sensors) are provided. Each respective bend sensor may generate bend data indicating the amount that the respective sensor is bent or flexed from an initial or designated position (e.g., relative to an initial straight position). By evaluating a set of bend data for the conduit, in some aspects, the system can determine or infer the relative positioning of the ends of the conduit. Such determinations may be beneficial in a wide variety of implementations. For example, in the case of display cables (e.g., HDMI cables), the relative positioning information may enable automated configuration of the display device(s) (e.g., allowing content to flow seamlessly across the display(s) based on their position relative to each other, as indicated by the cable end positioning). As one example, the system may determine or infer that a laptop is placed in a particular location to the left of and below a television, allowing content to be readily displayed across the laptop and television displays (e.g., allowing users to move content to the television by dragging the content through the upper-right side of the laptop display).

As additional examples, aspects of the present disclosure can generally be used to facilitate detection or determination of conduit endpoints to enable improvements such as more efficient cable routing in datacenters, dynamic and/or automated determination of relative speaker locations (e.g., allowing the sound profile emitted by each speaker to be modified based on the relative positioning of the speakers), wire tracing for cables or conduits hidden in walls (e.g., across multiple floors), dynamic determination of which earbud (of a set of wireless headphones) is in the left ear and which is in the right car (e.g., automated audio modification of the left and right channels to ensure the sound is delivered properly to the user's left and right cars), and the like.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Turning to FIG. 1, computing environment 100 contains an example of an environment for the execution of at least some of the computer code involved in performing the inventive methods, such as positioning code 180. In addition to positioning code 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and positioning code 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in positioning code 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in positioning code 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
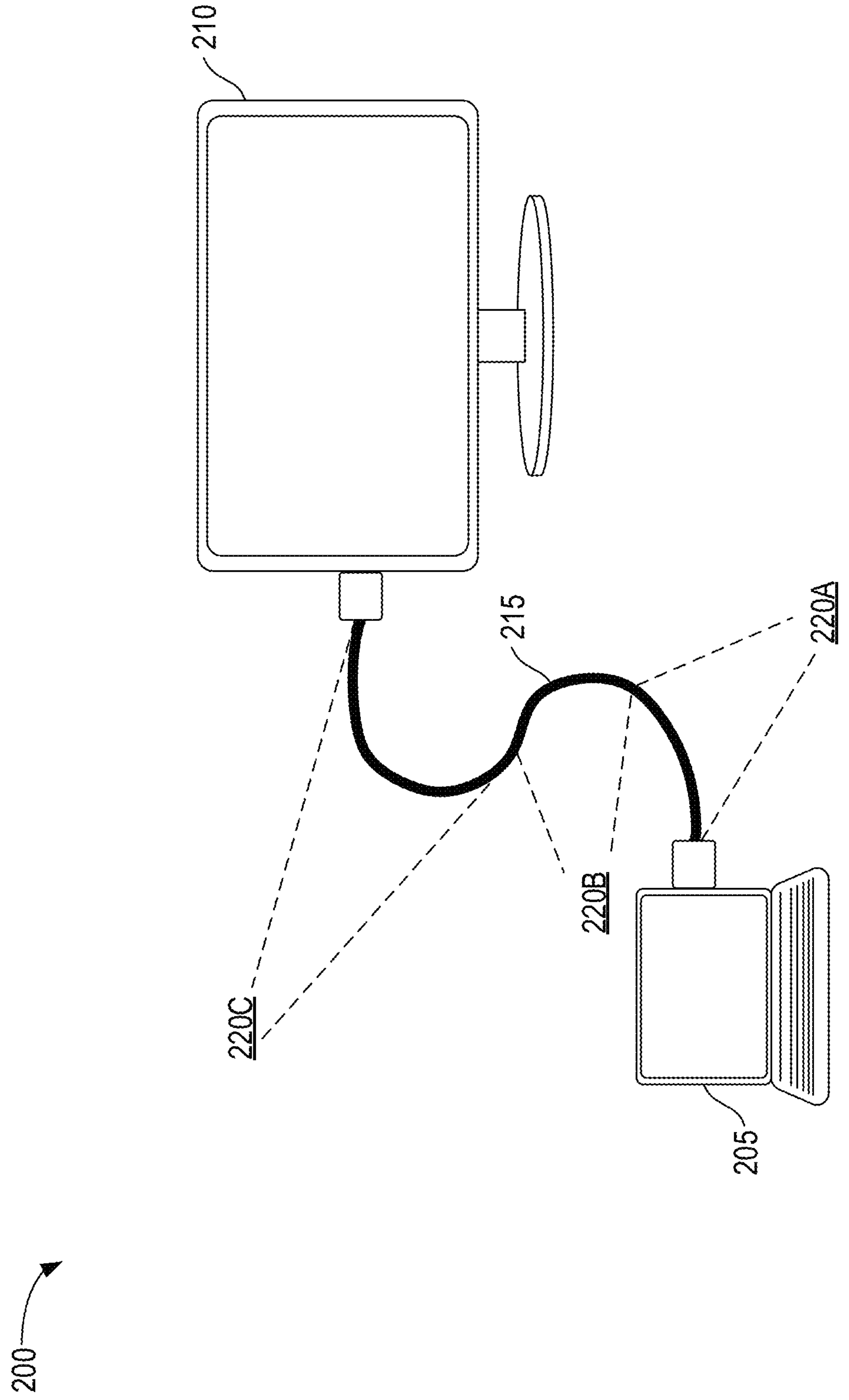
FIG. 2 depicts a system for determining relative positioning of flexible conduit, according to some embodiments of the present disclosure.

FIG. 2 depicts a system 200 for determining relative positioning of flexible conduit, according to some embodiments of the present disclosure.

In the illustrated example, a computing device 205 (e.g., a laptop computer) is coupled or linked to a display 210 (e.g., a monitor or television) via a conduit 215. In some aspects, as discussed above, the conduit 215 is flexible. That is, the conduit 215 may be able to flex or bend at least a minimum amount. In some embodiments, the flexibility of the conduit 215 may be defined based on the tightest curvature under which the conduit 215 can still elastically deform (referred to in some aspects as the minimum bend radius). For example, in some embodiments, the conduit 215 may be referred to as flexible if its minimum bend radius is below a threshold, such as less than about 5 inches, less than about 10 inches, less than about 2 inches, and the like. In some embodiments, the conduit 215 may be referred to as flexible if it is capable of being deformed to a new shape (even if such deformation is inelastic). For example, metal pipe may be bent using a variety of tools, and some other materials are more readily bendable when heated (e.g., using a heat gun). In some embodiments, the conduit 215 may be referred to as "flexible" to generally indicate that the relative positioning of each end, relative to the other, is not fixed or known a priori, For example, in some embodiments, the conduit 215 corresponds to an HDMI cable or other communications cable. In some embodiments, the computing device 205 can use the conduit 215 to facilitate use of the display 210 as an external display or monitor (e.g., to duplicate or extend the display of the computing device 205). Although the illustrated example depicts a computing device 205 and display 210, in some embodiments, as discussed above, the conduit 215 may generally correspond to a wide variety of cables, pipes, and the like, and the devices or objects coupled to either end of the conduit 215 may vary depending on the particular implementation.

In the illustrated example, the conduit 215 has several bends between the computing device and the display 210. In some embodiments, the conduit 215 is logically and/or physically delineated into sections 220A, 220B, and 220C (collectively, sections 220), such as based on the bend sensor configuration. For example, each section 220 may include one or more corresponding bend sensors that can be used to generate bend data for the corresponding section 220.

In some embodiments, the length of each section 220 and/or the total length of the conduit 215 may be known (e.g., stored in a memory or other storage associated with the conduit 215, such as within the computing device 205, within the display 210, and/or within the conduit 215 itself (e.g., within one of the ends or heads of the conduit 215)). Further, in some embodiments, each bend sensor may report the current amount of bend in its corresponding section between a defined minimum and maximum value (e.g., where −180 and/or 180 may indicate that the section 220 is fully bent backwards, and 0 indicates that the section 220 is not bent at all).

In some embodiments, each bend sensor may have a bend axis for which the bend data corresponds (e.g., where the output of the bend sensor is based on the amount of bend in the bend axis of the sensor, regardless of the amount of bend in other dimensions). In some such embodiments, each section 220 may therefore include a set of bend sensors (e.g., at least one for each bend axis in three-dimensional space). In some embodiments, the sections 220 may include bend sensors on four sides of the conduit 215, as discussed in more detail below. This may enable more accurate bend estimation (e.g., due to different radiuses of curvature on the inside of the bend compared to the outside of the bend). For example, in the illustrated system 200, the bend sensors for the first section 220A may indicate that one bend sensor (e.g., the bend sensor on the inside of the curve) is bent by fifteen degrees while the opposite bend sensor (on the outside of the curve) is bent by 5 degrees. Based on this information, it may be inferred or determined that the section 220A is bent towards the side of the conduit 215 where the first sensor is disposed by an amount between five and fifteen degrees. In some embodiments, the average of the bend angles in the bend axis on each side of the conduit 215 may be used as the determined bend amount in this axis (e.g., where the section 220A is bent ten degrees).

In some embodiments, each bend sensor in each section 220 of the conduit 215 can collect this respective bend data and provide it (e.g., transmit the data) to a system or component that aggregates the bend data. For example, in some embodiments, a component on one or either end of the conduit 215 (e.g., embedded in the head of the conduit 215 that couples to the computing device 205 and/or display 210) may receive the bend data for analysis. In some embodiments, the bend data may be provided to one or both systems on either end of the conduit 215 (e.g., to the computing device 205 and/or the display 210). Generally, the bend data from each sensor may be transmitted using any suitable technique, including via one or more dedicated or additional communication links (e.g., a new pin or conductor in or on the conduit 215) and/or via an unused conductor of the conduit 215 (e.g., a conductor that already exists in the conduit 215 but is not used). For example, if the conduit 215 is a type A HDMI cable, pin 14 (e.g., the fourteenth conductor) is generally unused and may be used for the bend data. Similarly, for type B HDMI cables, pins 23 and/or 24 may be used.

In some embodiments, the bend data is processed by a component of the conduit 215 itself to aggregate the bends and determine the relative positioning of the display 210 and computing device 205. This relative position information may then be transmitted to one or both of the connected devices. In some embodiments, the bend data is provided to one or both of the connected devices, and the connected device(s) may evaluate the bend data to determine the relative positioning.

In some embodiments, to use the bend data, one or more components of the system 200 may generally evaluate the bend data for each section 220 of the conduit 215 to determine the relative positioning of each end of the section 220, as discussed in more detail below. For example, beginning with one end (e.g., the head coupled to the computing device 205), the component(s) may define this starting point as the origin (e.g., (0,0,0) in three-dimensional space). Based on the length of the first section 220A and the bend data from sensors in the first section 220A, the component(s) may estimate, determine, or infer the location of the other end of the section 220A, relative to the first end of the conduit 215 (e.g., a location and/or orientation in three-dimensional space relative to the origin, which is the first end of the conduit 215). The component(s) may then repeat this analysis for each section 220, aggregating (e.g., adding) the locations appropriately to determine the position of the other end of the conduit 215 (relative to the first end). For example, when evaluating the section 220B, the component(s) may use the determined position of the end of the section 220A (which is the start of the section 220B) as the initial position, and compute the end position of the section 220B. This process can be repeated for the section 220C (beginning at the ending point of the section 220B) and for any subsequent sections. When the position of the final section 220 in the conduit 215 is determined, the component(s) can return these coordinates as the relative position of the other end of the conduit 215, relative to the first (starting) location.

As discussed above, the connected device(s) may generally perform a variety of operations based on the determined relative positioning. For example, in some embodiments, the computing device 205 may configure its own operations and/or the operations of the display 210 based on the relative position (e.g., such that when the user moves the cursor off the top-right corner of the computing device 205, the cursor enters the display 210 at the corresponding location on the bottom-left corner, in the illustrated example). Advantageously, this automated position detection can substantially improve the flexibility and adaptability of the combined system 200. For example, users may connect their personal devices to the conduit 215 to use the display 210 in a shared space (e.g., a temporary workspace) and allow the devices to automatically calibrate and align themselves. Similarly, if the user moves or repositions the computing device 205 and/or the display 210, the system(s) may automatically detect this reconfiguration and adjust the display properties accordingly.

In some embodiments, to facilitate these operations, the component(s) (e.g., the display 210, the computing device 205, or both) may know the location of their port(s) to which the conduit 215 couples. That is, in the case of HDMI, the computing device 205 may know that the HDMI port is in a given position (e.g., on the right side of the display of the computing device in the illustrated example), and the display 210 may similarly know that the HDMI port is in a given position (e.g., on the left side of the display in the illustrated example). These positions (relative to the center of the displays of the respective devices) may be used (e.g., added to the inferred or determined positions of each end of the conduit 215) to facilitate appropriate configuration.

Figure 3:
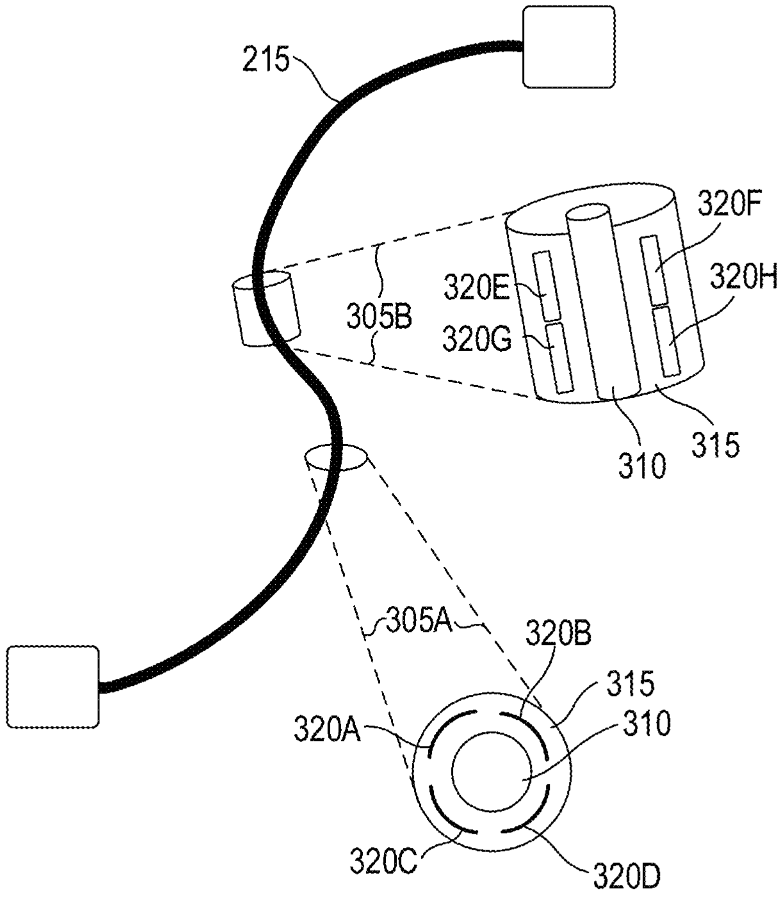
FIG. 3 depicts a set of bend sensors to facilitate determination of the relative positioning of flexible conduit, according to some embodiments of the present disclosure.

FIG. 3 depicts a set of bend sensors 320 to facilitate determination of the relative positioning of flexible conduit 215, according to some embodiments of the present disclosure.

Specifically, in the illustrated example, the conduit 215 comprises one or more conductors 310 (e.g., copper cabling) for transmitting information, as well as a protective sheath 315 (e.g., a plastic or rubber sheath). In some embodiments, the conductors 310 are able to conduct electric (e.g., analog or digital signals) while the sheath 315 is non-conductive. Although a single conductor 310 is depicted for conceptual clarity, in some aspects, the conduit 215 may include multiple conductors 310 (each electrically isolated from the others). Further, although a sheath 315 is depicted, in some aspects, the conduit 215 may lack a sheath (e.g., if one is not needed) and/or each conductor may have its own sheath (e.g., the conduit 215 may be a bundle of discrete wires). Further, in some embodiments, the conductor 310 may be replaced with a hollow tube to contain other objects or items, such as liquids, gasses, small solids, wires or cables, and the like.

In the illustrated example, as illustrated by the lines 305A, a cross-section of the conduit 215 (e.g., a slice perpendicular to the longitudinal axis of the conduit 215) is displayed. In the illustrated example, a set of four bend sensors 320A, 320B, 320C, and 320D (collectively, bend sensors 320) are arranged in a concentric ring around the conductor 310, within the sheath 315. Although depicted as residing in the sheath 315, in some embodiments, the bend sensors may be affixed to the conduit 215 or conductor 310 using any suitable technique. In the illustrated example, the bend sensors 320 are configured to surround the conductor 310, with the bend sensor 320A and 320D on opposite sides of the conduit 215, and the bend sensors 320C and 320B on opposite sides of the conduit 215 (and perpendicular to the bend sensors 320A and 320D).

As illustrated by the lines 305B, a second cross-section of the conduit 215 (e.g., a slice along the longitudinal axis of the conduit 215) is displayed. In the illustrated example, a set of four bend sensors 320E, 320F, 320G, and 320H (collectively, bend sensors 320) are arranged along the length of the conductor 310, within the sheath 315. Specifically, the bend sensors 320E and 320F on opposite sides of the conduit 215 at the same longitudinal position, and the bend sensors 320G and 320H are on opposite sides of the conduit 215 (at a second longitudinal position).

In this way, as discussed above, the bend sensors 320A-D may be used to provide bend data for a given section of the conduit 215 (e.g., for the area where the cross-section corresponds), the bend sensors 320E-F may be used to provide bend data for a second section, and the bend sensors 320G-H may be used to provide bend data for a third section (adjacent to the second section). Further, the bend sensors 320A and 320D may be used to provide bend data along one axis of the conduit 215, while the bend sensors 320B and 320C are used to provide bend data along the perpendicular axis. In some embodiments, by combining the data from each sensor 320, the system can determine the bend of each section in three-dimensional space.

In the illustrated example, the bend sensors 320 do not overlap. That is, no portion of the conduit 215 has overlapping bend sensors 320 on the same side of the conduit 215 (e.g., on the same side of the conductor) within a given section, and the bend sensors from the same or different sections do not overlap along the longitudinal axis. This can enable efficient position information (e.g., using fewer sensors and with reduced communication and compute overhead).

Figure 4:
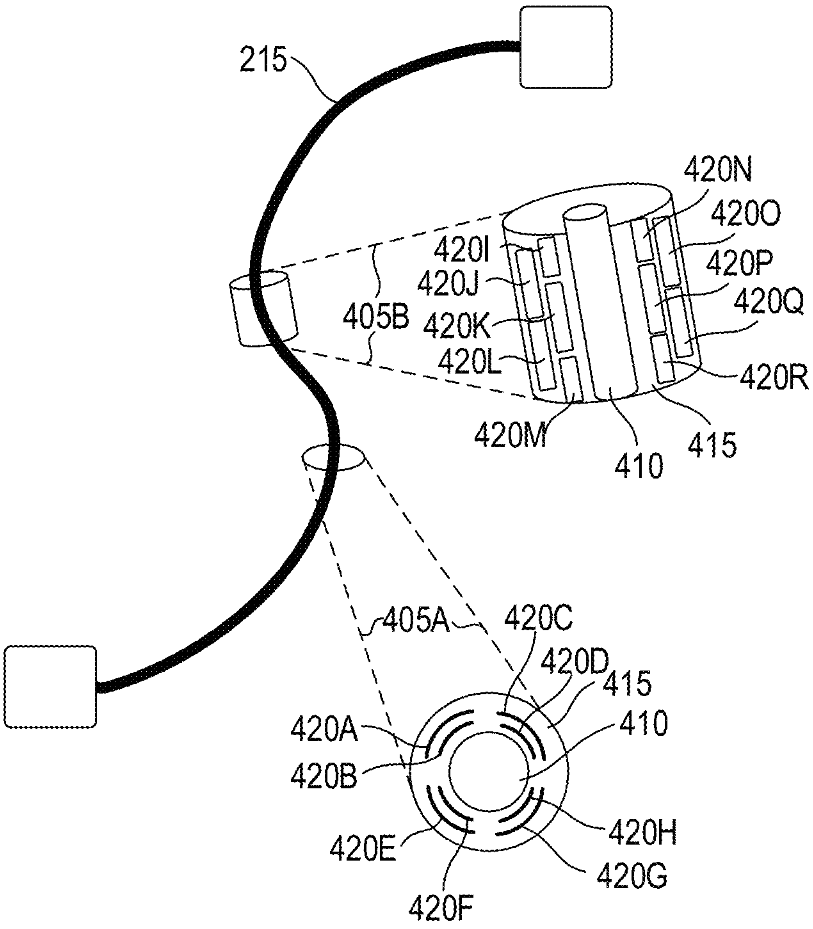
FIG. 4 depicts a set of bend sensors in an overlapping arrangement to facilitate determination of the relative positioning of flexible conduit, according to some embodiments of the present disclosure.

FIG. 4 depicts a set of bend sensors 420 in an overlapping arrangement to facilitate determination of the relative positioning of flexible conduit 215, according to some embodiments of the present disclosure.

Specifically, as discussed above, the conduit 215 comprises one or more conductors 410 (e.g., copper cabling) for transmitting information and/or tube areas, as well as a protective sheath 415 (e.g., a plastic or rubber sheath). In the illustrated example, as illustrated by the lines 405A, a cross-section of the conduit 215 (e.g., a slice perpendicular to the longitudinal axis of the conduit 215) is displayed. In the illustrated example, a set of eight bend sensors 420A, 420B, 420C, 420D, 420E, 420F, 420G, and 420H (collectively, bend sensors 420) are arranged in a concentric ring around the conductor 410, within the sheath 415. Although the bend sensors are generally depicted with four sensors (two on each side of the conductor 410) perpendicular to the other four sensors, in some aspects, the sensors may be position in a further overlapping manner. For example, in the illustrated conduit 215, the bend sensor 420C and the bend sensor 420D both provide bend data for the same axis of the conduit 215 from the same side of the conductor 410. This may provide additional accuracy and robustness, but may also introduce additional computational and transmit overhead. In some embodiments, the outer ring of bend sensors (e.g., including the bend sensors 420A, 420C, 420G, and 420E) may be offset relative to the inner ring (e.g., such that the bend sensor 420D is positioned between and/or overlapping with the bend sensors 420B and 420D of the inner ring, to bridge the gap between them).

As illustrated by the lines 405B, a second cross-section of the conduit 215 (e.g., a slice along the longitudinal axis of the conduit 215) is displayed. In the illustrated example, the bend sensors are partially overlapping along the longitudinal axis of the conduit 215. Specifically, the bend sensors 420 in the outer ring (e.g., the bend sensors 420J, 420L, 420O, and 420Q) are positioned to overlap with the bend sensors in the inner ring in the longitudinal axis. This longitudinal overlapping configuration may enhance the accuracy of the determined positioning (with potentially increased computational expense).

In some embodiments, the cross-section corresponding to the lines 405A may be referred to as depicting longitudinal overlap (as illustrated in the cross-section corresponding to the lines 405B) without axial overlap. In some embodiments, if the outer and/or inner ring of bend sensors are offset relative to the inner ring, the conduit 215 may be said to exhibit axial overlap. Generally, the bend sensors may have no overlap (as illustrated in FIG. 3), axial overlap, longitudinal overlap, or both axial and longitudinal overlap. The various configurations may be used in different implementations. Further, though two rings of sensors are depicted for conceptual clarity, embodiments of the present disclosure may generally include any number and variety of sensors and rings with any amount of overlap.

Figure 5:
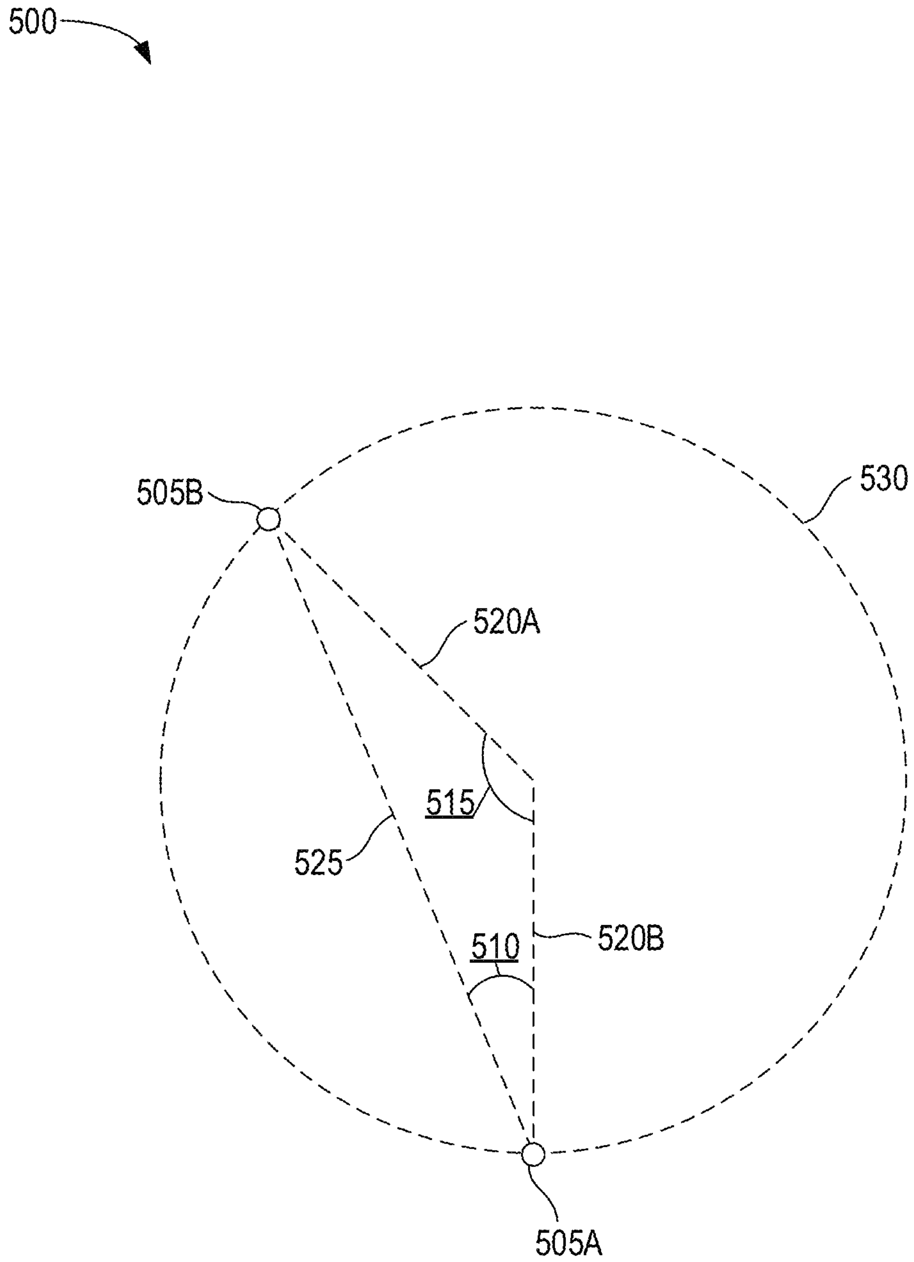
FIG. 5 depicts a workflow to determine relative positioning of flexible conduit, according to some embodiments of the present disclosure.

FIG. 5 depicts a workflow 500 to determine relative positioning of flexible conduit, according to some embodiments of the present disclosure. In some embodiments, the workflow 500 can be performed by one or more components of the conduit itself (e.g., a component on the conduit 215 of FIG. 2), by one or more systems connected to the conduit (e.g., the computing device 205 and/or the display 210, each of FIG. 2), and the like.

In the illustrated workflow 500, the displacement of each section of the conduit is approximated using an isosceles triangle with two sides 520A and 520B having equal length (defined based on the length of the section of conduit), where the length of the third side 525 indicates the relative offset of the ends of the conduit (or section thereof). That is, a circle 530 having a radius of one half of the length of the section may be used to determine the relative offset of the section. Specifically, the point 505A represents the position of one end of the section (e.g., the section 220 of FIG. 2) in space, and the workflow 500 is used to find the position of the other end (at point 505B). This process can then be repeated for the next section (beginning with point 505B as the initial or start point).

In some embodiments, the workflow 500 is performed one or more times for each section (e.g., each section 220 of FIG. 2) of the conduit based on the bend data for the section (as well as the known length of the section). In the illustrated example, the workflow 500 is performed in a two-dimensional plane (e.g., to determine the offset of the section in an (x,y) plane for conceptual clarity. In some embodiments, the illustrated workflow 500 may be readily performed in three-dimensional space (based on bend data for multiple axes), and/or may be performed multiple times for each section (e.g., performing the workflow 500 three times in one-dimensional space, once for each dimension, or twice in two-dimensional space).

In the illustrated example, the length of the sides 520A and 520B are each half the length of the given section of conduit. That is, the total length of the sides (e.g., beginning at the point 505A, proceeding straight to the center of the circle 530, and then out to the point 505B) is equal to the length of the section of conduit. In this way, the sides 520A and 520B may approximate the positioning of the section of conduit. Further, in the illustrated example, the angle 510 is determined based on the bend data returned by the bend sensor(s) of the section. For example, if the system has determined that the section's total bend angle is 30 degrees, the angle 510 may be set to 30 degrees.

In the depicted workflow 500, the system may first determine the value of the angle 515 based on the bend data (e.g., the angle 510). For example, the angle 515 may be defined as D=180−2α, where D is the angle 515 and α is the angle 510. The system may then determine the length of the side 525 based on the angles 510 and 515, as well as the length of the sides 520A and 520B. For example, in some aspects, the length of the side 525 may be defined as $$S = 2r\sin\left(\frac{D}{2}\right),$$

where S is the length of the side 525 and r is the length of each of the sides 520. Equivalently, the length of the side 525 may be defined as $$S = 2r\sin\left(\frac{180 - 2a}{2}\right),$$

and/or as S=2r sin(90−α).

In some embodiments, the system may then use S to find the position of the point 505B (e.g., $(x_{n+1}, y_{n+1})$) in relation to the position of the point 505A (e.g., $(x_n, y_n)$). For example, in some embodiments, the location of the point 505B on one axis (e.g., the x-axis) may be defined as $x_{n+1}$=S sin(a+90)+$x_n$ or, equivalently, as $x_{n+1}$=(2r sin (90−a))(sin (α+90))+$x_n$. Similarly, the location on the y-axis may be defined as fined as $y_{n+1}$=S cos(a+90)+$y_n$ or, equivalently, as $y_{n+1}$=(2r sin(90−a))(cos(α+90))+$y_n$.

In this way, based on the position of the first end of the section (at point 505A), the bend data (e.g., the angle 510), and the length of the section (e.g., the length of the sides 520A and 520B), the system can determine the position of the other end of the section (at point 505B) relative to the position of the first end (at point 505A). As discussed above, this process can then be repeated until all sections have been evaluated in all relevant dimensions to determine the position of one end of the conduit relative to the position of the other end of the conduit. That is, the total offset of the other end of the conduit (relative to the first end) may be defined, for the x-axis, as $$x_{total} = \sum\nolimits_{n=1}^{k} x_n$$

and for y-axis, as $$y_{total} = \sum\nolimits_{n=1}^{k} y_n,$$

where k is the number of sections in the conduit. As discussed above, this yields the relative position of the other end of the cable in the xy plane. The workflow 500 can then be repeated to determine the relative position in the xz plane and/or yz plane, as desired.

In some embodiments, using the workflow 500, any twists or coils within the conduit may be accounted for automatically, as the relative top, bottom, right, and left bend sensors (in relation to the conductor) may contort as a single unit. Therefore, if the wire twists in a given direction, the position is still determinable using the workflow 500 as the angle of flex for each bend sensor will change based on the twist.

Figure 6:
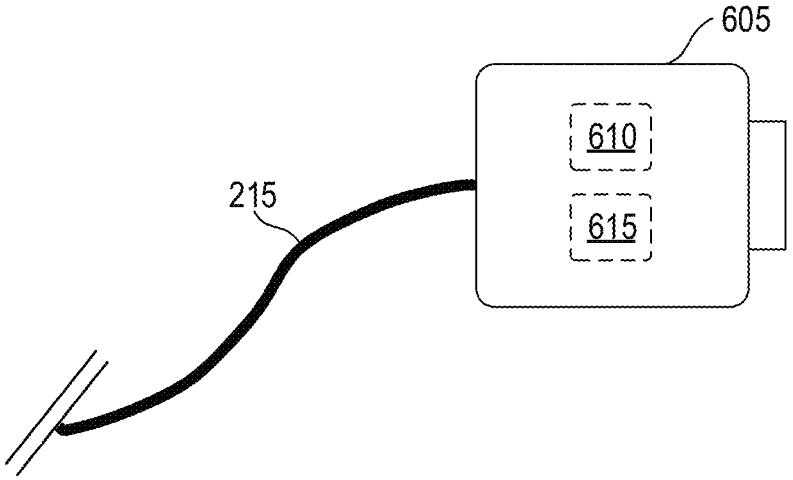
FIG. 6 depicts components of a flexible conduit, according to some embodiments of the present disclosure.

FIG. 6 depicts components of a flexible conduit 215, according to some embodiments of the present disclosure.

The illustrated example depicts one side or end of a conduit 215 with a head 605 (e.g., an HDMI plug end). As illustrated, the head 605 includes a processing component 610 and a transmission component 615 included therein. Although depicted as residing in one head 605 of the conduit 215, in some embodiments, the depicted components may reside in either head, in both heads, at one or more positions along the length of the conduit, and/or on one or both of the devices coupled by the conduit 215.

In some embodiments, the processing component 610 (which may correspond to a computing circuit) is generally configured to collect and aggregate the bend data from each bend sensor along the conduit 215. In some embodiments, the processing component 610 may evaluate the bend data (e.g., using the workflow 500) to determine the relative positioning of the two heads of the conduit 215. The transmission component 615 (which may correspond to a computing circuit, or may correspond to another means to transmit data, such as an unused pin in the conduit 215) is generally used to provide data related to the bends and/or positioning of the conduit 215 to one or more connected devices (e.g., the computing device 205 of FIG. 2). For example, in some embodiments, the transmission component 615 can be used to provide the set of bend data (e.g., bend angles for each bend sensor) and any other relevant data (such as the length of each section) to the computing device, allowing the computing device to determine the relative end positioning. In some embodiments, if the processing component 610 performs this evaluation, the transmission component 615 may provide the determined position offset to one or both connected devices, allowing the connected device(s) to reconfigure themselves and/or each other appropriately.

Figure 7:
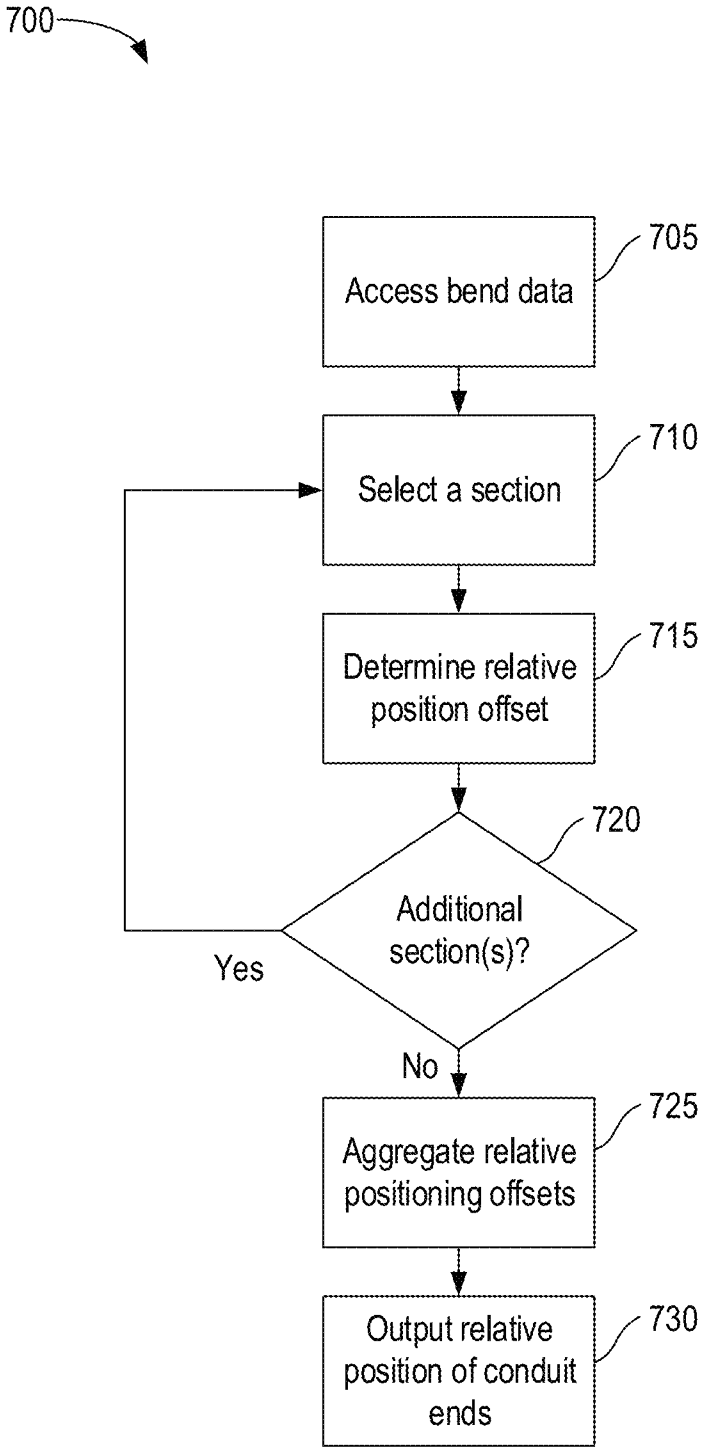
FIG. 7 is a flow diagram depicting an example method for determining the relative positioning of a flexible conduit, according to some embodiments of the present disclosure.

FIG. 7 is a flow diagram depicting an example method 700 for determining the relative positioning of a flexible conduit, according to some embodiments of the present disclosure. In some embodiments, the method 700 is performed by one or more components of a conduit (such as the conduit 215 of FIG. 2) and/or by one or more components of a device connected to the conduit (such as the computing device 205 of FIG. 2).

At block 705, the component(s) access bend data from one or more bend sensors in the conduit. For example, as discussed above, the component(s) may receive the bend data from each sensor in each section of the conduit. As used herein, "accessing" data may generally include receiving, requesting, retrieving, obtaining, collecting, computing, generating, or otherwise gaining access to the data.

At block 710, the component(s) select a section of the conduit. In some embodiments, the component(s) may first select one of the terminal sections of the conduit (e.g., a section terminated by the end of the conduit on one side). During subsequent iterations, the component(s) may select the adjacent section, moving down the conduit until all sections have been processed.

At block 715, the component(s) determine the relative position offset of the selected section (e.g., the location of the second end of the section, relative to the first end of the section), as discussed above. For example, the component(s) may use the workflow 500 of FIG. 5 to determine the positional offset of the other end of the section in one or more dimensions.

At block 720, the component(s) determine whether there is at least one additional section of the conduit remaining to be processed. If so, the method 700 returns to block 710. If not, the method 700 continues to block 725, where the component(s) aggregate the relative offsets computed for each section (at block 715). For example, as discussed above, the component(s) may sum the offsets in each relevant dimensions.

At block 725, the component(s) outputs the relative positions of the ends of the conduit. For example, as discussed above, the component(s) may provide the determined offsets to one or both connected devices, and/or to one or more applications or hardware systems that use the offsets to perform various tasks such as reconfiguration of display devices.

While the foregoing is directed to embodiments of the present invention, other and further embodiments of the invention may be devised without departing from the basic scope thereof, and the scope thereof is determined by the claims that follow.

What is claimed is:

1. An apparatus, comprising:

a transmission cable comprising a first end and a second end;

a set of bend sensors affixed to the transmission cable along a longitudinal axis of the transmission cable and configured to output bend data indicating bends in the transmission cable along perpendicular axes of the transmission cable at points within a conductor of the transmission cable surrounded by multiple bend sensors of the set of bend sensors; and a processing component configured to determine a relative position of the first end of the transmission cable relative to the second end of the transmission cable based on the bend data.

2. The apparatus of claim 1, wherein:

the multiple bend sensors at a respective point within the conductor of the transmission cable comprise at least four respective bend sensors of the set of bend sensors.

3. The apparatus of claim 1, wherein the set of bend sensors comprise two or more bend sensors affixed to a first side of the transmission cable and at least partially overlapping along the longitudinal axis of the transmission cable.

4. The apparatus of claim 1, further comprising a transmission component configured to transmit the relative position of the first end of the transmission cable to at least one of (i) a computing device coupled to the first end of the transmission cable or (ii) a computing device coupled to the second end of the transmission cable.

5. The apparatus of claim 4, wherein:

the transmission cable comprises a plurality of conductors, at least one conductor of the plurality of conductors is designated as an unused conductor, and the transmission component comprises the unused conductor.

6. The apparatus of claim 1, wherein the processing component is configured to determine the relative position of the first end of the transmission cable based further on a length of the transmission cable along a longitudinal axis of the transmission cable.

7. The apparatus of claim 1, wherein:

the set of bend sensors are configured to output bend data for each of a plurality of sections of the transmission cable, the processing component is configured to determine the relative position of the first end of the transmission cable based on:

determining, for each respective section of the plurality of sections, a respective position offset; and aggregating the respective position offsets.

8. A cable comprising:

a conductor comprising a first end and a second end;

a set of bend sensors affixed to the conductor and configured to output bend data indicating bends in the conductor; and a transmission component configured to output the bend data to at least one of (i) a computing device coupled to the first end of the conductor or (ii) a computing device coupled to the second end of the conductor.

9. The cable of claim 8, wherein:

the set of bend sensors are affixed along a longitudinal axis of the conductor, and each respective point within the conductor is surrounded by at least four respective bend sensors of the set of bend sensors.

10. The cable of claim 9, wherein the set of bend sensors comprise two or more bend sensors affixed to a first side of the conductor and at least partially overlapping along the longitudinal axis of the conductor.

11. The cable of claim 8, further comprising a processing component configured to determine a relative position of the first end of the conductor relative to the second end of the conductor based on the bend data.

12. The cable of claim 11, wherein the processing component is configured to determine the relative position of the first end of the conductor based further on a length of the conductor along a longitudinal axis of the conductor.

13. The cable of claim 11, wherein:

the set of bend sensors are configured to output bend data for each of a plurality of sections of the conductor, the processing component is configured to determine the relative position of the first end of the conductor based on:

determining, for each respective section of the plurality of sections, a respective position offset; and aggregating the respective position offsets.

14. The cable of claim 8, further comprising a plurality of conductors, wherein:

at least one conductor of the plurality of conductors is designated as an unused conductor, and the transmission component comprises the unused conductor.

15. A flexible conduit, comprising:

a first end and a second end;

a set of bend sensors affixed to the flexible conduit along a longitudinal axis of the flexible conduit and configured to output bend data indicating bends in the flexible conduit along perpendicular axes of the flexible conduit at points within a conductor of the flexible conduit surrounded by multiple bend sensors of the set of bend sensors; and a processing component configured to determine a relative position of the first end of the flexible conduit relative to the second end of the flexible conduit based on the bend data.

16. The flexible conduit of claim 15, wherein:

the multiple bend sensors at a respective point within the conductor of the flexible conduit comprise at least four respective bend sensors of the set of bend sensors.

17. The flexible conduit of claim 15, wherein the set of bend sensors comprise two or more bend sensors affixed to a first side of the flexible conduit and at least partially overlapping along the longitudinal axis of the flexible conduit.

18. The flexible conduit of claim 15, further comprising a transmission component configured to transmit the relative position of the first end of the flexible conduit to at least one of (i) a computing device coupled to the first end of the flexible conduit or (ii) a computing device coupled to the second end of the flexible conduit.

19. The flexible conduit of claim 15, wherein the processing component is configured to determine the relative position of the first end of the flexible conduit based further on a length of the flexible conduit along a longitudinal axis of the flexible conduit.

20. The flexible conduit of claim 15, wherein:

the set of bend sensors are configured to output bend data for each of a plurality of sections of the flexible conduit, the processing component is configured to determine the relative position of the first end of the flexible conduit based on:

determining, for each respective section of the plurality of sections, a respective position offset; and aggregating the respective position offsets.

* * * * *